United States Patent
Simmons et al.

(10) Patent No.: US 7,620,203 B1
(45) Date of Patent: Nov. 17, 2009

(54) IMAGING SYSTEM ANALYSIS METHODS AND APPARATUS

(75) Inventors: Rulon Eugene Simmons, Rochester, NY (US); Timothy DeWald Elder, Rochester, NY (US); David Jonathan Stewart, Rochester, NY (US); Eric John Cincotta, Pittsford, NY (US); Carolyn A. Kenndey, Canandaigua (CA); Richard Craig Van Nostrand, Rochester, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 848 days.

(21) Appl. No.: 11/089,114

(22) Filed: Mar. 24, 2005

(51) Int. Cl.
*G06K 9/00* (2006.01)

(52) U.S. Cl. .................. 382/103; 382/191; 382/203

(58) Field of Classification Search .......... 382/103, 382/191, 203
See application file for complete search history.

(56) References Cited

U.S. PATENT DOCUMENTS

| | | | |
|---|---|---|---|
| 6,763,136 B1 | 7/2004 | Sweet | |
| 6,778,702 B1 | 8/2004 | Sweet | |
| 7,079,151 B1* | 7/2006 | Rublee | 345/589 |
| 7,215,828 B2* | 5/2007 | Luo | 382/289 |
| 2007/0189386 A1* | 8/2007 | Imagawa et al. | 375/240.12 |

OTHER PUBLICATIONS

John P. Kerekes et al., "Spectral Quality Metrics for VNIR and SWIR Hyperspectral Imagery", Proc. of SPIE, vol. 5425, pp. 549-557, (2004).
J. Leachtenauer and R.G. Driggers, "Surveillance and Reconnaissance Imaging Systems: Modeling and Performance Prediction", Artech House, Inc. Norwood, MA, pp. 168-171, 212-213, 312-315, 360-363, (2001).
Sylvia S. Shen, "Spectral Quality Equation Relating Collection Parameters to Object/Anomaly Detection Performance", Proc. of SPIE, vol. 5093, (2003).
Richard Vollmerhausen, Electro-Optics Imaging Systems, Chapter 12, pp. 35-37, (2000).
G. Holst, Electro-optical Imaging: System Performance and Modeling, SPIE Press Monograph vol. PM 96, SPIE International Society for Optical Engineering (2000).

* cited by examiner

*Primary Examiner*—Gregory M Desire
(74) *Attorney, Agent, or Firm*—RatnerPrestia (57) ABSTRACT

Methods, systems, and computer program products for analyzing an imaging system or an image produced by the imaging system are disclosed. The imaging system is configured to sense a target on a background and the target, background, and imaging system are associated with spatial information and spectral information. The imaging system or image is analyzed by, first, determining two of a spatial confidence level associated with the spatial information, a spectral confidence level associated with the spectral information, and a total confidence level associated with sensing the target on the background. A non-determined one of the spatial confidence level, the spectral confidence level, and the total confidence level is then calculated responsive to the determined confidence levels for use in analyzing the imaging system or image.

27 Claims, 5 Drawing Sheets

Target Samples = 120
Background Samples = 120
False Alarms = 10
Missed Targets = 14
Misidentified = 24

Prob. of Misidentification =
 24/240 = .10

Prob. of Correct Identification
 = 1 - .10 = .90

Integrated Non-likelihood Ratio
 = (10+14)/120 = .20

Integrated Likelihood Ratio
 = (120-(10+14))/120 = .80

IMAGING SYSTEM ANALYSIS METHODS AND APPARATUS

FIELD OF THE INVENTION

The present invention relates to the field of imaging and, more particularly, to methods and apparatus for analyzing spectral imaging systems.

BACKGROUND OF THE INVENTION

Spectral imaging systems are often used to acquire spectral images of land masses in order to identify features of interest. For example, spectral images of a rain forest may be acquired to identify the presence of a particular type of vegetation in the rain forest and spectral images of a military zone may be used to identify the presence of military equipment such as airplanes and tanks in the military zone. Thus, these spectral imaging systems may be used to identify both relatively large and relatively small features of interest in a wide range of land mass types and areas. Spectral imaging systems vary in their ability to produce images for sensing such features within these diverse land masses. Hence, methods and apparatus for analyzing spectral imaging systems, e.g., to assessing their ability to produce images in which features of interest may be identified, are useful.

There is an ever present desire for imaging system improvements. Accordingly, a need remains for improved methods, systems, and computer program products to analyze spectral imaging systems.

SUMMARY OF THE INVENTION

The present invention is embodied in methods, systems, and computer program products for analyzing an imaging system or an image produced by the imaging system. The imaging system is configured to sense a target on a background and the target, background, and imaging system are associated with spatial information and spectral information. The imaging system or image is analyzed by, first, determining two of a spatial confidence level associated with the spatial information, a spectral confidence level associated with the spectral information, and a total confidence level associated with sensing the target on the background. A non-determined one of the spatial confidence level, the spectral confidence level, and the total confidence level is then calculated responsive to the determined confidence levels for use in analyzing the imaging system or image.

BRIEF DESCRIPTION OF THE DRAWINGS

The invention is best understood from the following detailed description when read in connection with the accompanying drawings, with like elements having the same reference numerals. Included in the drawings are the following figures.

DETAILED DESCRIPTION OF THE INVENTION

Figure 1:
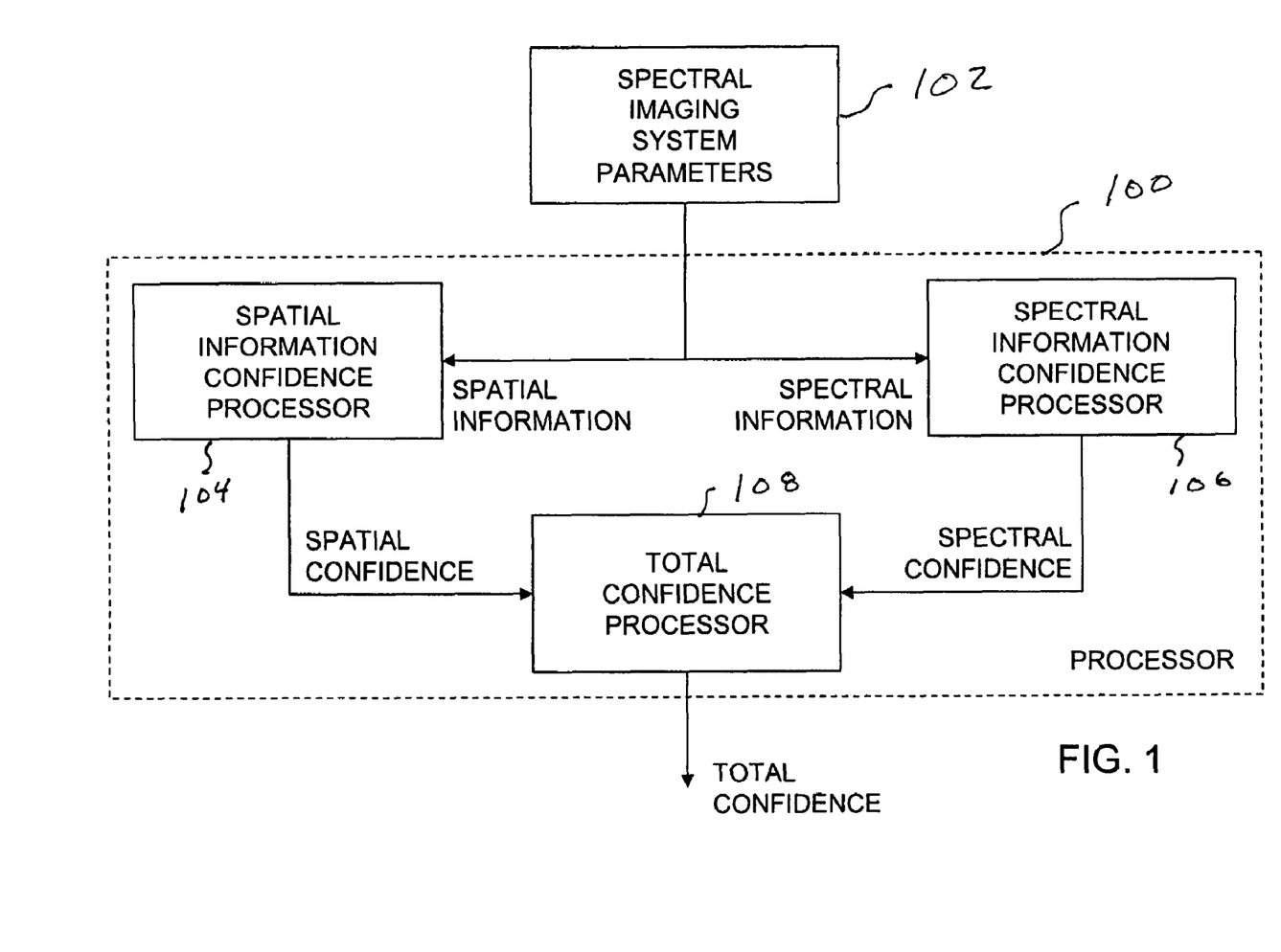
FIG. 1 is a block diagram of an exemplary confidence processor in accordance with an aspect of the present invention.

FIG. 1 depicts an exemplary confidence processor 100 for analyzing spectral imaging system parameters 102 that is useful for providing an overview of the present invention. The spectral imaging system parameters 102 are associated with a spectral imaging system or one or more spectral images produced by a spectral imaging system. In an exemplary embodiment, the spectral imaging system parameters 102 are processed to determine the suitability of a spectral imaging system (or the images produced by the system) for a particular purpose, e.g., the identification of a target against a background. Various other applications of the present invention will be understood by those of skill in the art from the description herein. For example, the present invention may be used to design a spectral imaging system that is well-suited for a particular purpose such as the identification of a target against a background. To facilitate description, the present invention is described in terms of assessing a spectral imaging system, however, those of skill in the art will understand how to assess one or more spectral images produced by such imaging systems from the description herein.

The spectral imaging system parameters 102 include spatial information (e.g., size and shape) and spectral information (e.g., one or more characteristic spectra). The spatial information includes parameters for determining a spatial confidence level and the spectral information includes parameters for determining a spectral confidence level, both of which will be described in further detail below. In an exemplary embodiment, the spectral imaging system parameters 102 include target size (e.g., size of minimum dimension of a target), target characteristic spectra, background characteristic spectra, ground sampling distance (GSD), relative edge response (RER), and noise (e.g., signal-to-noise ratio). The target size, GSD, RER, and Noise are exemplary spatial information parameters. The target spectra, background spectra, and noise are exemplary spectral information parameters. Suitable spatial information parameters and spectral information parameters for use with the present invention will be understood by those of skill in the art from the description herein and may include one or more of the exemplary parameters described above and/or different parameters.

The spectral imaging system parameters 102 correspond to a spectral imaging system. The spectral imaging system may include one or more cameras that capture images. In an exemplary embodiment, the spectral imaging system may include a single spectral imaging camera that is associated with both spectral information (information associated with a collection of multiple spectral wavelengths of the camera) and spatial information (information associated with the distance between gathered samples). In an alternative exemplary embodiment, the spectral imaging system may include multiple spectral imaging cameras with one or more cameras associated with the spectral and/or spatial information. In another exemplary embodiment, the spectral imaging system, in addition to the one or more spectral cameras, may include at least one spatial camera (i.e., monochrome or panchromatic) associated with at least a portion of the spatial information. For example, the spectral imaging system may include one or more spectral cameras that capture spectral images of an area and have associated spectral information and may also include a spatial camera that captures a spatial image of that area and has associated spatial information.

A suitable spectral imaging system for use with the present invention is a satellite based imaging system such as the digital camera systems used in the IKONOS satellite, which are accessible through DigitalGlobe® of Longmont, Colorado, USA. Other suitable imaging systems include terrestrial based imaging systems, airplane based imaging systems, medical imaging systems, or essentially any imaging system that produces spatial information and spectral information. The selection of a suitable spectral imaging system will be understood by one of skill in the art from the description herein.

The confidence processor 100 receives and processes the spatial information and the spectral information to generate a total confidence level. The illustrated confidence processor 100 includes a spatial information confidence processor 104, a spectral information confidence processor 106, and a total confidence processor 108. In an exemplary embodiment, the spatial information confidence processor 104, the spectral information confidence processor 106, and the total confidence processor 108 are independent processors. In an alternative exemplary embodiment, the processing performed by two or more of these processors is performed by a single processor. The processors 104, 106, and 108 may be associated with one or more databases (not shown). The processing performed by one or more of the processors 104, 106, or 108 may be performed manually and, thus, one or more of the processors 104, 106, or 108 may be eliminated.

The spatial information confidence processor 104 processes spatial information to determine a spatial confidence level. The spatial confidence level represent the ability to sense (e.g., detect, recognize, and/or identify) a target based on spatial information (e.g., size and/or shape). An exemplary method for determining a spatial confidence level is described below with reference to FIG. 2. Various other suitable methods for determining a suitable spatial confidence level will be understood by those of skill in the art from the description herein. Such confidence levels may be normalized to a particular range, e.g., from zero to one.

Figure 2:
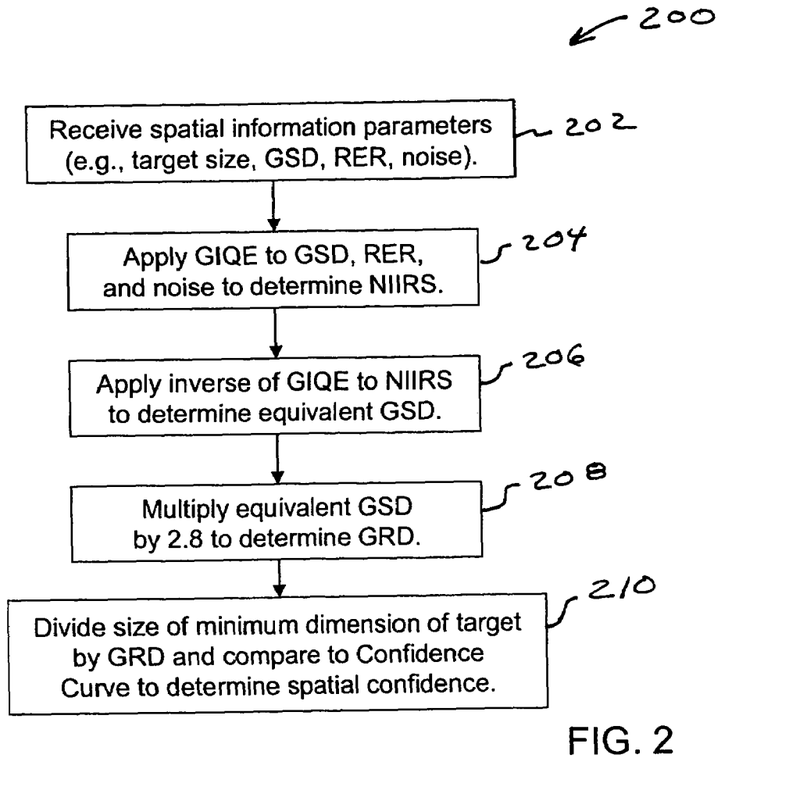
FIG. 2 is a flow chart of exemplary steps for determining a spatial confidence level in accordance with an aspect of the present invention.

FIG. 2 depicts a flow chart 200 of exemplary steps for determining a spatial confidence level. The exemplary steps of the flow chart 200 may be performed by the spatial information confidence processor 104 of FIG. 1. At block 202, spatial information parameters are received. In an exemplary embodiment, the spatial information parameters are input parameters received from a user and include a target size, GSD, RER, and noise. In an alternative exemplary embodiment, one or more of the parameters may be retrieved from a database based on user input parameters. For example, if a user specifies a known target and a target size for the known target is located in a database, the target size may be automatically retrieved from the database as a result of the user specifying the known target.

At block 204, the GSD, RER, and noise parameters are processed using a General Image Quality Equation (GIQE) to determine a National Imagery and Interpretability Rating Scale (NIIRS) value. The NIIRS is a well-known 10-level scale applied to various interpretation tasks such as identifying targets. At block 206, the NIIRS value determined at block 204 is used to determine an equivalent GSD by inversely applying the GIQE assuming a perfect RER (e.g., RER=1.0) and no noise.

At block 208, the equivalent GSD determined at block 206 is processed to determine a Ground Resolved Distance (GRD). In the illustrated embodiment, the equivalent GSD is multiplied by 2.8 (which is a factor that linearly relates GSD and GRD in diffraction-limited systems) to determine the GRD. In alternative embodiments, the GRD may be based on GSD rather than equivalent GSD and the steps of blocks 204 and 206 may be omitted.

Figure 3:
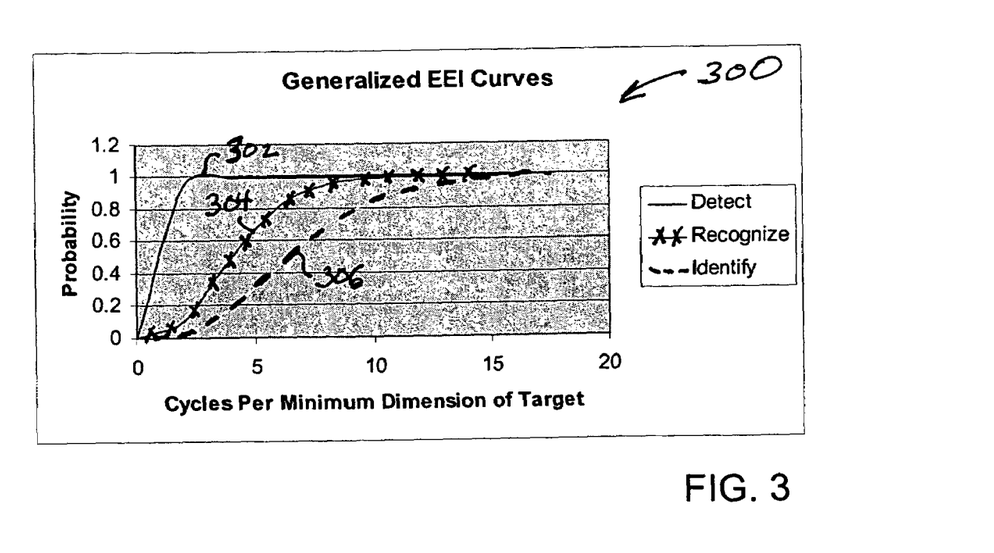
FIG. 3 is a graph depicting probability (confidence level) curves for use in describing the determination of the spatial confidence levels in the steps of FIG. 2.

At block 210, the size of the minimum dimension of the target (target size) is divided by the determined GRD and the result is compared to one or more spatial confidence curves to determine one or more spatial confidence levels. FIG. 3 depicts an exemplary spatial confidence curve graph 300 of confidence curves depicting the probability (confidence levels) associated with detecting, recognizing, and identifying targets. Detection of a target, which is represented by detection curve 302, is associated with a reasonable probability (confidence level) that the target is a general type of target, e.g., a military vehicle. Recognition of a target, which is represented by recognition curve 304, is associated with a higher degree of specificity, e.g., a tank, a truck, or an airplane. Identification of a target, which is represented by identification curve 306, is associate with an even higher degree of specificity, e.g., a particular type of tank. As depicted in FIG. 3, for the same number of cycles per minimum dimension of a target, a target can be detected with greater confidence than it can be recognized or identified. Note that "cycles" refers to maximum number of repeating bar pairs, e.g. black and white, that can resolved in an image over the equivalent distance of the minimum dimension of a specified target.

The confidence level curves 302, 304, and 306 may be expressed as shown in equation 1:

$$Prob = (N/N_{50})^E / (1 + (N/N_{50})^E) \tag{1}$$

where Prob equals probability (confidence level), E equals $2.7 + 0.7(N/N_{50})$, N equals number of cycles per minimum dimension of target, and $N_{50}$ equals cycle criteria for 50 percent success (where $N_{50}$ equals 1.0±0.25 for detection, 1.4±0.35 for recognition, and 6.4±1.5 for identification). Additional details relating to equation 1 may be found in G. Holst, *Electro-optical Imaging: System Performance and Modeling*, SPIE PRESS Monograph Vol. PM96, SPIE International Society for Optical Engineering (2000) and in J. Leachtenaur and R. G. Driggers, *Surveillance and Reconnaissance Imaging Systems: Modeling and Performance Prediction*, Artech House, Inc., Norwood, Mass. (2001), both of which are incorporated herein by reference.

In an exemplary embodiment, a confidence level is determined by comparing the result of dividing the target size by the GRD to data points stored in a database to identify a corresponding point on one of the curves and then selecting a probability (confidence level) associated with that point. In an alternative exemplary embodiment, the probability (confidence level) may be calculated using equation 1. In an exemplary embodiment, a spatial confidence level for each of detection, recognition, and detection is determined. In alternative exemplary embodiments, one or more of these confidence levels may be determined or a user may specify which spatial confidence level to determine.

Referring back to FIG. 1, the spectral information confidence processor 106 processes the spectral information to determine a spectral confidence level. The spectral confidence level represents the ability to sense a target based on spectral information, e.g., the spectral separability of the target from its background. An exemplary method for determining a spectral confidence level is described below with reference to FIG. 4. Various other suitable methods for determining a suitable spectral confidence level will be understood by those of skill in the art from the description herein. For example, spectral separability can be determined using algorithms such as Spectral Similarity Value (SSV), Mahalanobis Distance, and Bhattacharya Distance, for example. Additional details regarding the SSV can be found in U.S. Pat. No. 6,763,136 to Sweet entitled Method and Apparatus for Determining Spectral Similarity and U.S. Pat. No. 6,778,702 to Sweet entitled Method and Apparatus for Assessing the Quality of Spectral Images. In general, these metrics can then be transformed into spectral confidence by application of an appropriate weighting factor or other functional relationship. Such confidence levels may be normalized to a particular range, e.g., from zero to one.

Figure 4:
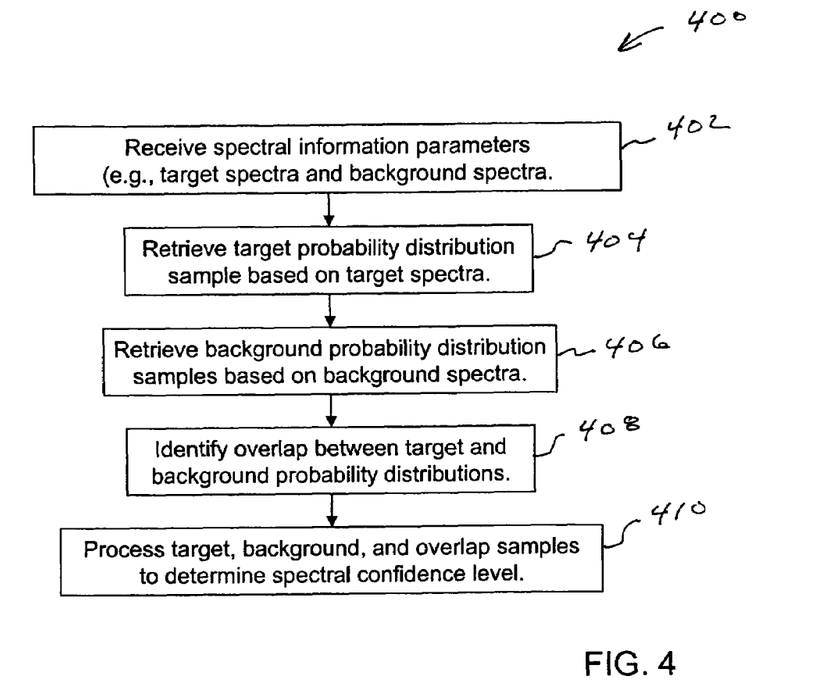
FIG. 4 is a flow chart of exemplary steps for determining a spectral confidence level in accordance with an aspect of the present invention.

FIG. 4 depicts a flow chart 400 of exemplary steps for determining a spectral confidence level. The exemplary steps of the flow chart 400 may be performed by the spectral information confidence processor 106 of FIG. 1. At block 402, spectral information parameters are received. In an exemplary embodiment, the spectral information parameters are input parameters received from a user and include target spectra and background spectra. In an alternative exemplary embodiment, one or more of the parameters may be retrieved from a database based on user input parameters. For example, if a user specifies a known target and spectral information for the known target is located in a database, the target spectra may be automatically retrieved from the database as a result of the user specifying the known target.

At block 404, target probability distribution is retrieved based on the target spectra. The probability distribution for the target spectra may be comprised of samples that are gathered experimentally in a known manner for storage in a database. The stored probability distribution associated with the target spectra may then be retrieved from the database in response to the target spectra being received at block 402. In an exemplary embodiment, the samples within the target probability distribution are represented in terms of reflectance or in terms of radiance, for example.

At block 406, background probability distribution is retrieved based on the background spectra. The probability distribution for the background spectra may be comprised of samples that are gathered experimentally in a known manner for storage in a database. The stored probability distribution associated with the background spectra may then be retrieved from the database in response to the background spectra being received at block 402. In an exemplary embodiment, the samples within the background probability distribution are represented in terms of reflectance or in terms of radiance, for example.

At block 408, overlap between the target probability distribution and the background probability distribution is identified. Overlap of the target samples with the background samples may result in missed targets (i.e., targets that are misidentified as background) and overlap of the background samples with the target samples may result in false alarms (i.e., background that is misidentified as targets). The overlapped samples characterized as missed targets and as false alarms can be adjusted by the placement of a threshold defining the boundary between samples that will be considered target and those that will be considered background. In an exemplary embodiment, overlap is determined by comparing values (e.g., reflectance value or radiance value) from the target and background samples. Target and background samples with the same value may be identified as overlap samples.

Figure 5:
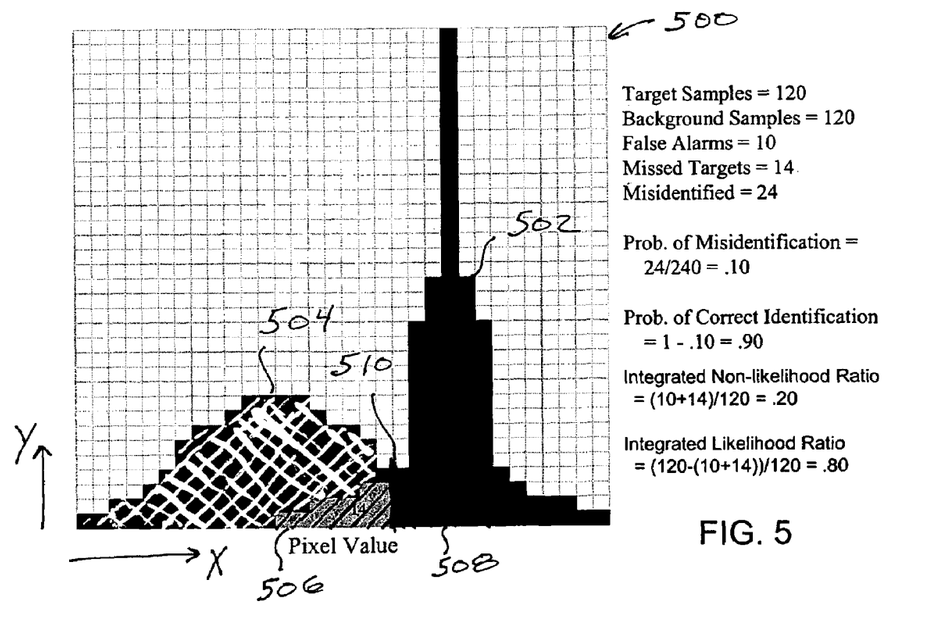
FIG. 5 is a single spectral channel graph notionally depicting the overlap between a target and a background for use in describing the determination of the spectral confidence level in the steps of FIG. 4.

FIG. 5 depicts a graph 500 illustrating a one-dimensional representation of the above methodology, e.g., for a single spectral band. The graph 500 includes a target distribution 502 and a background distribution 504. The x-direction in the graph 500 represents pixel value (e.g., in terms of increasing reflectance or radiance) and the y-direction in the graph 500 represents the number of samples. The overlap of the target distribution 502 into the background distribution 504 across a threshold 510 may result in missed targets (represented by missed target area 506) and the overlap of the background distribution 504 into the target distribution 502 across the threshold 510 may result in false alarms (represented by false alarm area 508). The data in FIG. 5 includes 120 target samples and 120 background samples for a total of 240 samples. Of those 240 samples, 14 target samples overlap into the background samples across the threshold 510 and 10 background samples overlap into the target samples across the threshold 510 for a total of 24 overlapping samples.

Figure 6:
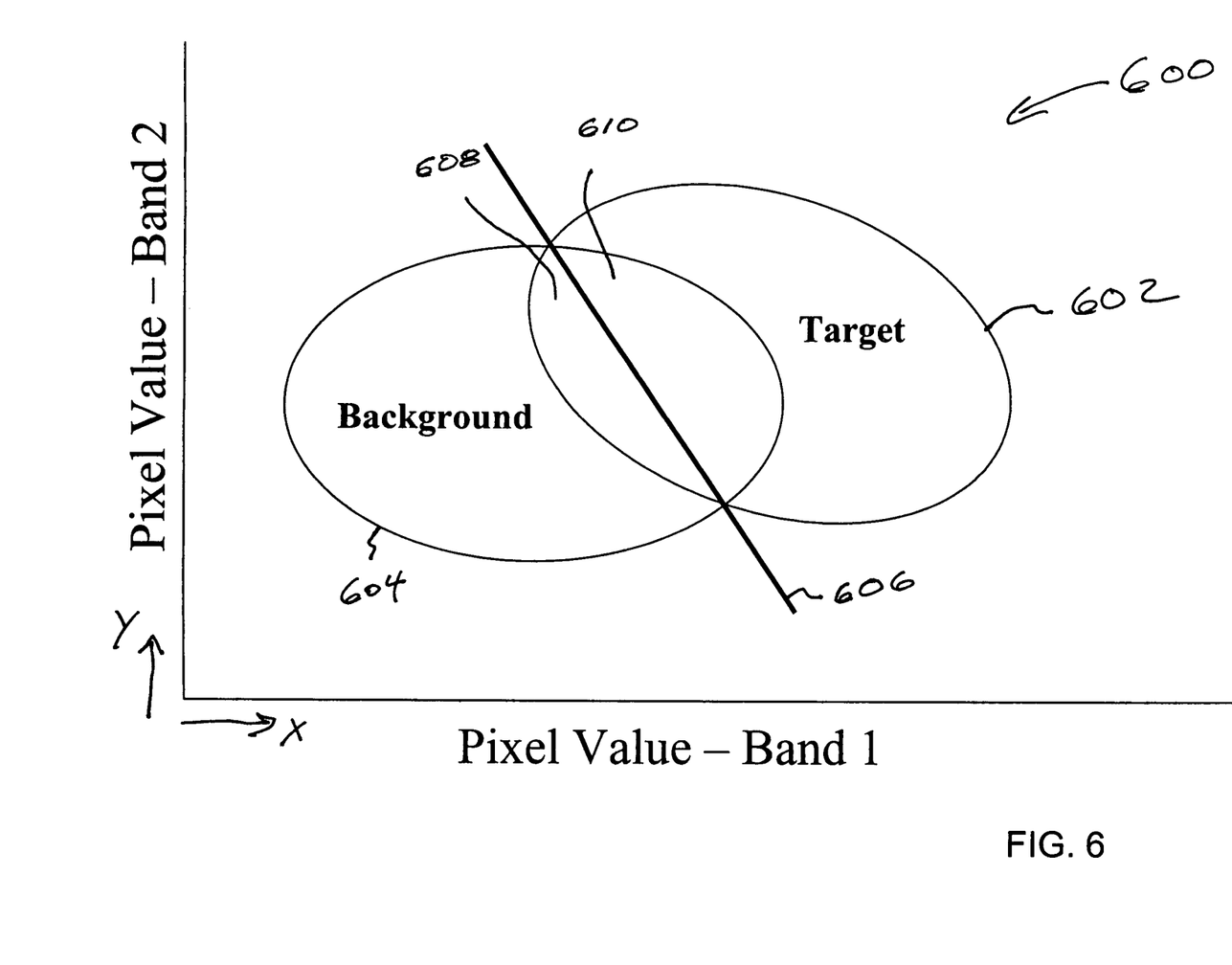
FIG. 6 is a double spectral channel graph notionally depicting the overlap between a target and a background for use in describing the determination of the spectral confidence level in the steps of FIG. 4.

FIG. 6 depicts a graph 600 illustrating a two-dimensional representation of the above methodology, e.g., for two spectral bands. The graph 600 includes a target distribution 602 and a background distribution 604 for two spectral bands. The x-direction represents a value for a first of the two spectral bands and the y-direction represents a value for a second of the two spectral bands. The overlap of the target distribution 602 into the background distribution 604 over a threshold 606 may result in missed targets (represented by missed target area 608) and the overlap of the background distribution 604 into the target distribution 602 over the threshold 606 may result in false alarms (represented by false alarm area 610). Although FIG. 5 and FIG. 6 represent one and two spectral bands, respectively, it will be understood by those of skill in the art from the description herein that the concept can be expanded to any number (N) of spectral bands to find the overlap of the spectra in N-dimensional space. Generally, more bands result in less overlap between the target and the background. The identification of overlap of the target and the background for systems representing more than two spectral bands will be understood by those of skill in the art from the description herein.

Referring back to FIG. 4, at block 410, the target, background, and overlap information is processed to determine the spectral confidence level. In an exemplary embodiment, the spectral confidence level is determined by determining an Integrated Likelihood Ratio (FIG. 5) and, optionally, applying an appropriate weighting function to the Integrated Likelihood Ratio. In an exemplary embodiment, the Integrated Likelihood Ratio is determined as the portion of the target probability distribution that could be confused with missed targets or false alarms. For example, of the 120 target samples depicted in FIG. 5, 24 samples overlap and, thus, the Integrated Likelihood Ratio is (120 sample−24 overlap samples)/120 samples=0.80. An appropriate weighting function to apply to the determined Integrated Likelihood Ratio may be determined empirically or theoretically in a manner that will be understood to one of skill in the art from the description herein.

In an alternative exemplary embodiment, the percentage of target samples in the target distribution that do not overlap the background samples in the background distribution is identified to determine the spectral confidence level. The spectral confidence level may range from 0.0 for complete overlap to 1.0 for complete separation of the distributions.

Referring back to FIG. 1, the total confidence processor 106 processes the spatial confidence level and the spectral confidence level to determine a total confidence level. The total confidence processor 106 combines the spatial confidence level and the spectral confidence level to determined a total confidence level that represents the ability to sense a target based on both spatial and spectral information. In an exemplary embodiment, the spatial confidence level and the spectral confidence level can be combined as shown in equation two (2) to calculate the total confidence level in accordance with an aspect of the invention.

$$C_{Total}=1-(1-C_{spatial})*(1-C_{spectral}) \quad (2)$$

In equation 2, $C_{Total}$ is the total confidence level, $C_{spatial}$ is the spatial confidence level, and $C_{spectral}$ is the spectral confidence level. Note that this equation can be expanded to incorporate confidence based on other sources of information by simply including additional multiplicative factors of the form (1–C). Note also that while a spectral image simultaneously gives both spectral and spatial information, the equation is applicable to cases where the information is not coincident in time or space such as fusing information from a high resolution panchromatic image with a lower resolution spectral image taken simultaneously or even at a different time.

In equation 2, when either spatial or spectral confidence is 1.0, the total confidence is 1.0. When both spatial and spectral confidence values are zero, the total confidence is zero. When both $C_{spatial}$ and $C_{spectral}$ are 0.5, the total confidence increases to 0.75. In this scenario, the spatial information may only be sufficient to confirm that an object in question has the proper size and/or shape of the target of interest. Knowing that the object has a spectral signature that could possibly be the target and that its size is also consistent with that of the target increases the overall confidence that the object is indeed the target of interest.

In an alternative exemplary embodiment, the spatial confidence level and the spectral confidence level may be combined as illustrated in equation three (3) to obtain the total confidence level in accordance with an aspect of the present invention.

$$C_{Total}=1-(1-W_1*C_{spatial})*(1-W_2*C_{spectral}) \quad (3)$$

In equation 3, $W_1$ is a spatial weighting factor (or function) and $W_2$ is a spectral weighting factor (or function). The weights may be applied to fine tune the results for real-world situations. For example, the detection of a particular spectral signature may or may not correlate precisely with a particular object if other objects are also known to have a similar signature. In this case, the weighing factors may be used to fine tune the confidence levels for detection of the particular object. If only spectral confidence level weighting is needed, the spatial weighting factor, W1, may be eliminated or set to 1.0. Likewise, if only spatial confidence level weighting is needed, the spectral weighting factor, W2, may be eliminated or set to 1.0.

The spectral weighting factor, W2, may be used to adjust the spectral confidence level when the area of a target is less than the area of a pixel associated with an imaging system. In this case, the spectral weighting factor, W2, may be determined based on the fractional abundance of the target within a pixel (e.g., by dividing the area of the target by the area of the pixel). The spectral weighting factor may further be refined to fine tune the results for real-world situations.

To accommodate a negative confidence level, e.g., if the spatial and/or spectral information suggests that an object is not the desired target (e.g., it is the wrong size or shape), equation 2 may be reformulated as illustrated in equation four (4).

$$C_{Total}=C_{spatial}+C_{spectral}+(|C_{spatial}*C_{spectral}|+C_{spatial}*C_{spectral})/2 \quad (4)$$

Equation 4 maintains the same values for positive confidence as in equation 1, but combines the information in an additive fashion when one of the confidence values is negative.

Contradictory confidences (e.g., opposite signs) can also be accommodated using equation five (5), which yields similar but not identical results to equation 4.

$$C_{Total}=\text{sign}(C_{positive}+C_{negative})*(1-(1-C_{maxabs})/(1-C_{minabs})) \quad (5)$$

where $C_{positive}$ is the positive confidence, $C_{negative}$ is the negative confidence, $C_{maxabs}$ is $\max(C_{positive}, |C_{negative}|)$, and $C_{minabs}$ is $\min(C_{positive}, |C_{negative}|)$. The denominator will only be zero if one confidence is –1 and the other is 1, in which case $C_{Total}$ may be defined as zero.

In equation 5, if $C_{spatial}=-C_{spectral}$, then $C_{Total}=0$. In addition, $C_{Total}$ will have the sign of the confidence with the largest magnitude but its magnitude will be smaller than $C_{maxabs}$. Thus, as expected, the opposite sign of the other confidence results in a reduced confidence level.

If both the spatial and spectral confidences are negative, the signs of equation 2 can be reversed to obtain equation six (6).

$$C_{Total}=-1+(1+C_{spatial})*(1+C_{spectral}) \quad (6)$$

Weighting factors similar to those used in equation 3 can also be applied to equations 4, 5, and 6.

Figure 7:
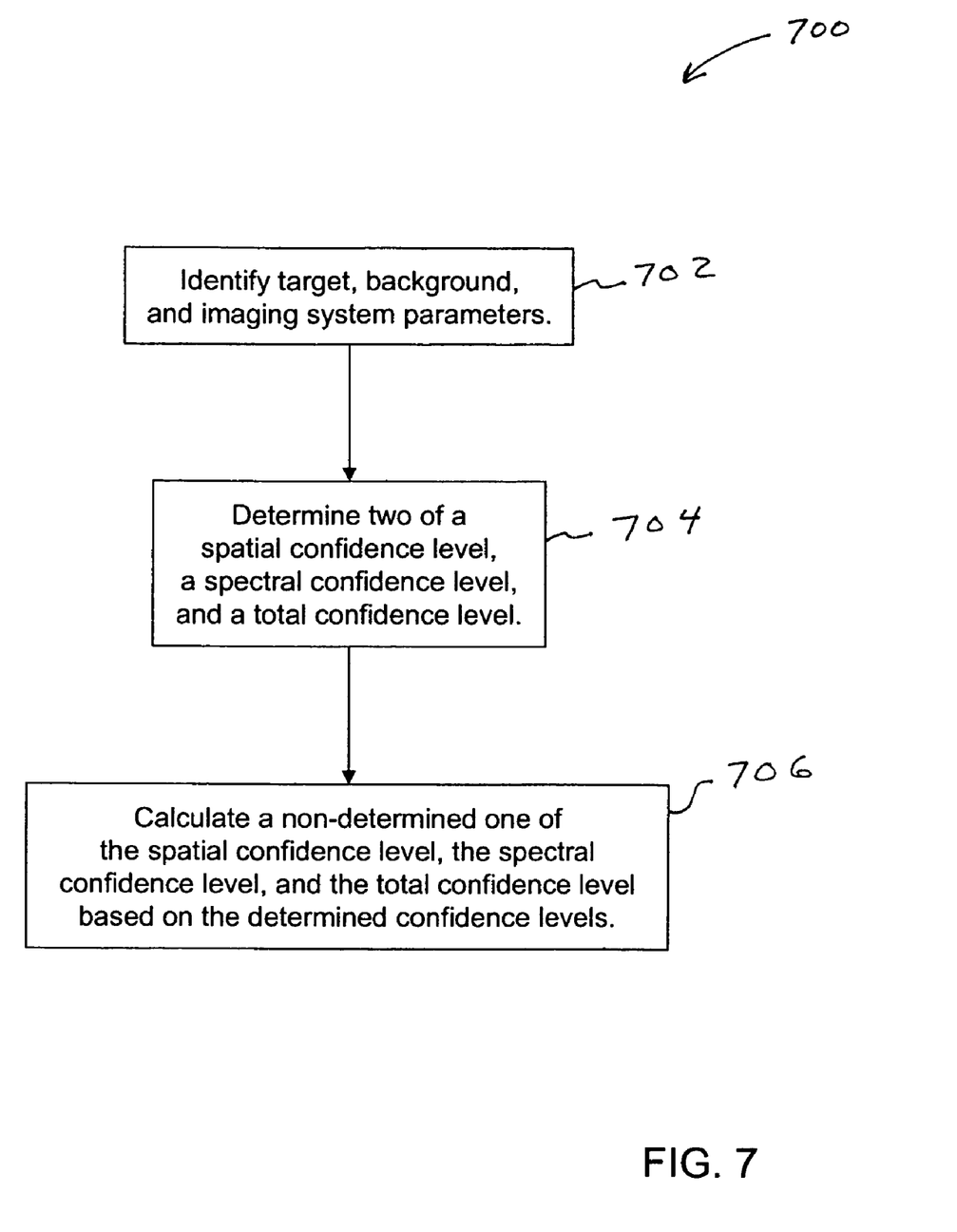
FIG. 7 is a flow chart of exemplary steps for determining confidence levels in accordance with an aspect of the present invention.

FIG. 7 depicts a flow chart 700 of exemplary steps for calculating confidence levels in accordance with various aspects of the present invention. At block 702, target, background, and imaging system parameters are identified. The target, background, and imaging system parameters include spatial information and spectral information. In an exemplary embodiment, the target parameters include a minimum dimension size and target spectra, the background parameters include background spectra, and the imaging system parameters include GSD, RER, and noise.

At block 704, two of a spatial confidence level, a spectral confidence level, and a total confidence level are determined. In an exemplary embodiment, the spatial confidence level and the spectral confidence level are determined as described above with reference to FIGS. 2 and 4. In alternative exemplary embodiments, the total confidence level and either the spatial confidence level or the spectral confidence level are determined. The total confidence level may be provided by a user. In addition, the spatial confidence level and/or the spectral confidence level may be provided by a user.

At block 706, a non-determined one of the spatial confidence level, the spectral confidence level, or the total confidence level are calculated based on the confidence levels determined in the step of block 704. If the spatial confidence level and the spectral confidence level are determined in the step of block 704, then the total confidence level is calculated, e.g., using one of equations 2-6.

If the total confidence level and the spatial confidence level are determined in the step of block 704, then the spectral confidence level is calculated, e.g., by rearranging and applying one of equations 2-6 in a manner that will be understood by one of skill in the art from the description herein. Thus, if the total confidence level and the spatial confidence level are known, the spectral confidence level can be calculated. This may be used to select components of an imaging system associated with a necessary spectral confidence level to achieve a specified total confidence level where the spatial confidence level is already determined, for example.

If the total confidence level and the spectral confidence level are determined in the step of block 704, then the spatial confidence level is calculated, e.g., by rearranging and applying one of equations 2-6 in a manner that will be understood by one of skill in the art from the description herein. This may be used to select components of an imaging system associated with a necessary spatial confidence level to achieve a specified total confidence level where the spectral confidence level is already determined, for example.

The present invention addresses spatial and spectral utility separately and then combines the results into an overall utility value (i.e., the total confidence level). A semantic transformation is performed to transform disparate (dissimilar) target information (e.g., spatial information and spectral information) into common terms (e.g., spatial confidence level and spectral confidence level) that can be directly combined to provide an overall confidence in performing a specified task. Addressing the spatial and spectral information separately provides the freedom to assess both types of information in the way that the information is actually assimilated (e.g., usually the spatial information is exploited visually while more than three or four bands of spectral information is usually exploited by computer algorithms). For the spectral information, target/background separability and/or either generic or the specific algorithms that an image analyst would be expected to use may be employed.

The present invention may be used, by way of non-limiting example, to:
1. Assess image quality/utility for all spectral imagery (including, but not limited to remote sensing systems, health imaging systems, etc.)
2. Predict image quality/utility for all spectral sensors (including, but not limited to remote sensing systems, health imaging systems, etc.)
3. Assign image sensing tasks to a diverse fleet of spectral and panchromatic sensors with various spatial and spectral resolution.
4. Design spectral sensors, e.g., by determining the spatial (spectral) confidence level needed to obtain a particular total confidence level given the spectral (spatial) confidence level.
5. Characterization of errors in spectral products.
6. Combine (fuse) spatial, spectral, and even temporal information from the same or multiple images for prediction or assessment of image utility/quality. A related subcategory is the prediction or assessment of image utility/quality for pan-sharpened spectral imagery.
7. Select bands for variable band collection systems to accomplish specified military, medical, and/or automated assembly-line quality control tasks.
8. Quality control on assembly lines.
9. Detection, quantification, and classification of medical materials, tissues, and pathogens, i.e., classification of cancer types.

Although the invention has been described in terms of a spatial information confidence processor 104 (FIG. 1), a spectral information confidence processor 106 (FIG. 1), and a total confidence processor 108 (FIG. 1), it is contemplated that the invention may be implemented in software on a computer (not shown). In this embodiment, one or more of the functions of the various components may be implemented in software that controls the computer. This software may be embodied in a computer readable carrier, for example, a magnetic or optical disk, a memory-card or an audio frequency, radio-frequency, or optical carrier wave.

Further, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method, using a computer, for analyzing an imaging system or an image produced by the imaging system, wherein the imaging system is configured to sense a target on a background, and the target, background, and imaging system are associated with spatial information and spectral information, the method comprising the steps of:

Determining, by the computer, two of the following three:
(a) a spatial confidence level associated with the spatial information,
(b) a spectral confidence level associated with the spectral information, and
(c) a total confidence level associated with sensing the target on the background; and
calculating, by the computer, one non-determined confidence level from the three confidence levels, responsive to the two determined confidence levels to analyze one of the imaging system or the image.

2. The method of claim 1, wherein the determining step of the computer comprises the steps of:
determining the spatial confidence level and the spectral confidence level; and wherein the calculating step comprises the step of:
calculating the total confidence level responsive to the determined spatial confidence level and the determined spectral confidence level.

3. The method of claim 1, wherein the determining step of the computer comprises the steps of:
determining the total confidence level and the spectral confidence level; and wherein the calculating step comprises the step of:
calculating, by the computer, the spatial confidence level responsive to the determined total confidence level and the determined spectral confidence level.

4. The method of claim 1, wherein the determining step comprises the steps of: determining, by the computer, the total confidence level and the spatial confidence level; and wherein the calculating step comprises the step of:
calculating, by the computer, the spatial confidence level responsive to the determined total confidence level and the determined spatial confidence level.

5. The method of claim 1, wherein the step of calculating the non-determined confidence level comprises the step of:
solving, by the computer:

$$C_{total} = 1 - ((1 - C_{spatial}) * (1 - C_{spectral}));$$

wherein $C_{total}$ equals the total confidence level, $C_{spatial}$ equals the spatial confidence level, and $C_{spectral}$ equals the spectral confidence level.

6. The method of claim 1, wherein the step of calculating the non-determined confidence level comprises the step of:
calculating, by the computer, the non-determined one of the spatial confidence level, the spectral confidence level, and the total confidence level responsive to the determined confidence levels and one or more weighting values.

7. The method of claim 1, wherein the step of calculating the non-determined confidence level comprises the step of:
solving, by the computer:

$$C_{total} = 1 - ((1 - W1 * C_{spatial}) * (1 - W2 * C_{spectral}));$$

wherein $C_{total}$ equal the total confidence level, $C_{spatial}$ equals the spatial confidence level, $C_{spectral}$ equals the spectral confidence level, W1 equal a spatial weighting value associated with the spatial confidence level, and W2 equals a spectral weighting value associated with the spectral confidence level.

8. The method of claim 1, wherein the step of calculating the non-determined confidence level comprises the step of:

solving, by the computer:

$$C_{Total} = C_{spatial} + C_{spectral} C_{spectral} + (|C_{spatial} * C_{spectral}|)2;$$

wherein $C_{total}$ equal the total confidence level, $C_{spatial}$ equals the spatial confidence level, and $C_{spectral}$ equals the spectral confidence level.

9. The method of claim 1, wherein the step of calculating the non-determined confidence level comprises the step of:

solving, by the computer:

$$C_{Total} = \text{sign}(C_{positive} + C_{negative}) * (1 - C_{maxabs})/(1 - C_{minabs}));$$

wherein $C_{total}$ equal the total confidence level, $C_{spatial}$ equals the spatial confidence level, $C_{spectral}$ equals the spectral confidence level, $C_{positive}$ equals $C_{spatial}$ if $C_{spatial}$ has a positive value and $C_{spectral}$ has a negative value, $C_{positive}$ equals $C_{spectral}$ if $C_{spectral}$ has a positive value and $C_{spatial}$ has a negative value, $C_{negative}$ equals $C_{spatial}$ if $C_{spatial}$ has a negative value and $C_{spectral}$ has a positive value, $C_{negative}$ equals $C_{spectral}$ if $C_{spectral}$ has a negative value and $C_{spatial}$ has a positive value, $C_{maxabs}$ is max ($C_{positive}$, $|C_{negative}|$), and $C_{minabs}$ is min ($C_{positive}$, $|C_{negative}|$).

10. The method of claim 1, wherein the step of calculating the non-determined confidence level comprises the step of:

solving, by the computer:

$$C_{Total} = -1 + (1 + C_{spatial}) * (1 + C_{spectral});$$

wherein $C_{total}$ equal the total confidence level, $C_{spatial}$ equals the spatial confidence level, and $C_{spectral}$ equals the spectral confidence level.

11. The method of claim 1, wherein the imaging system is associated with a first image having parameters and a second image having parameters and wherein the determining step comprises the steps of:

determining, by the computer, the spatial confidence level based at least in part on the first image parameters; and determining, by the computer, the spectral confidence level based at least in part on the second image parameters.

12. The method of claim 1, wherein the imaging system is associated with an image having parameters and wherein the determining step comprises the step of:

determining, by the computer, the spatial confidence level based at least in part on the image parameters; and determining, by the computer, the spectral confidence level based at least in part on the image parameters.

13. A system for analyzing an imaging system or an image produced by the imaging system, wherein the imaging system is configured to sense a target on a background and the target, background, and imaging system are associated with spatial information and spectral information, the system comprising:

means for determining two of the following three:
(a) a spatial confidence level associated with the spatial information,
(b) a spectral confidence level associated with the spectral information, and
(c) a total confidence level associated with sensing the target on the background; and means for calculating one non-determined confidence level from the three confidence levels, responsive to the two determined confidence levels to analyze one of the imaging system or the image.

14. The system of claim 13, wherein the determining means comprises:

means for determining the spatial confidence level and the spectral confidence level; and wherein the calculating means comprises:

means for calculating the total confidence level responsive to the determined spatial confidence level and the determined spectral confidence level.

15. The system of claim 13, wherein the determining means comprises:

means for determining the total confidence level and the spectral confidence level; and wherein the calculating means comprises:

means for calculating the spatial confidence level responsive to the determined total confidence level and the determined spectral confidence level.

16. The system of claim 13, wherein the determining means comprises:

means for determining the total confidence level and the spatial confidence level; and wherein the calculating means comprises:

means for calculating the spatial confidence level responsive to the determined total confidence level and the determined spatial confidence level.

17. The system of claim 13, wherein the calculating means comprises:

means for calculating the non-determined one of the spatial confidence level, the spectral confidence level, and the total confidence level responsive to the determined confidence levels and one or more weighting values.

18. A computer readable medium that is configured to control a computer to implement a processing method for analyzing an imaging system or an image produced by the imaging system, wherein the imaging system is configured to sense a target on a background and the target, background, and imaging system are associated with spatial information and spectral information, the processing method comprising the steps of:

determining two of the following three:
(a) a spatial confidence level associated with the spatial information,
(b) a spectral confidence level associated with the spectral information, and
(c) a total confidence level associated with sensing the target on the background; and calculating one non-determined confidence level from the three confidence levels, responsive to the two determined confidence levels to analyze one of the imaging system or the image.

19. The computer readable medium of claim 18, wherein the determining step for implementation by the computer comprises the steps of:

determining the spatial confidence level and the spectral confidence level; and wherein the calculating step for implementation by the computer comprises the step of:

calculating the total confidence level responsive to the determined spatial confidence level and the determined spectral confidence level.

20. The computer readable medium of claim 18, wherein the determining step for implementation by the computer comprises the steps of:

determining the total confidence level and the spectral confidence level; and wherein the calculating step for implementation by the computer comprises the step of:

calculating the spatial confidence level responsive to the determined total confidence level and the determined spectral confidence level.

21. The computer readable medium of claim 18, wherein the determining step for implementation by the computer comprises the steps of:

determining the total confidence level and the spatial confidence level; and wherein the calculating step for implementation by the computer comprises the step of:

calculating the spatial confidence level responsive to the determined total confidence level and the determined spatial confidence level.

22. The computer readable medium of claim 18, wherein the calculating step for implementation by the computer comprises the step of:

solving:

$$C_{total}=1-((1-C_{spatial})*(1-C_{spectral}));$$

wherein $C_{total}$ equals the total confidence level, $C_{spatial}$ equals the spatial confidence level, and $C_{spectral}$ equals the spectral confidence level.

23. The computer readable medium of claim 18, wherein the calculating step for implementation by the computer comprises the step of:

calculating the non-determined one of the spatial confidence level, the spectral confidence level, and the total confidence level responsive to the determined confidence levels and one or more weighting values.

24. The computer readable medium of claim 18, wherein the calculating step for implementation by the computer comprises the step of:

solving:

$$C_{total}=1-((1-W1*C_{spatial})*(1-W2*C_{spectral}));$$

wherein $C_{total}$ equal the total confidence level, $C_{spatial}$ equals the spatial confidence level, $C_{spectral}$ equals the spectral confidence level, W1 equal a spatial weighting value associated with the spatial confidence level, and W2 equals a spectral weighting value associated with the spectral confidence level.

25. The computer readable medium of claim 18, wherein the calculating step for implementation by the computer comprises the step of:

solving:

$$C_{Total}=C_{spatial}+C_{spectral}+(|C_{spatial}*C_{spectral}|+C_{spatial}*C_{spectral})/2;$$

wherein $C_{total}$ equal the total confidence level, $C_{spatial}$ equals the spatial confidence level, and $C_{spectral}$ equals the spectral confidence level.

26. The computer readable medium of claim 18, wherein the imaging system is associated with a first image having parameters and a second image having parameters and wherein the determining step implementation by the computer comprises the steps of:

determining the spatial confidence level based at least in part on the first image parameters; and determining the spectral confidence level based at least in part on the second image parameters.

27. The computer readable medium of claim 18, wherein the imaging system is associated with an image having parameters and wherein the determining step for implementation by the computer comprises the step of:

determining the spatial confidence level based at least in part on the image parameters; and determining the spectral confidence level based at least in part on the image parameters.

* * * * *

UNITED STATES PATENT AND TRADEMARK OFFICE
CERTIFICATE OF CORRECTION

| | | |
|---|---|---|
| PATENT NO. | : 7,620,203 B1 | Page 1 of 1 |
| APPLICATION NO. | : 11/089114 | |
| DATED | : November 17, 2009 | |
| INVENTOR(S) | : Rulon Eugene Simmons et al. | |

It is certified that error appears in the above-identified patent and that said Letters Patent is hereby corrected as shown below:

TITLE PAGE, ITEM (75) INVENTORS: DELETE "KENNDEY" AND REPLACE WITH
-- KENNEDY --

Signed and Sealed this

Ninth Day of February, 2010

David J. Kappos
*Director of the United States Patent and Trademark Office*